United States Patent
Ahmed et al.

(10) Patent No.: US 12,528,383 B2
(45) Date of Patent: Jan. 20, 2026

(54) KALMAN FILTER INITIALIZATION CONTROL STRATEGY

(71) Applicant: FCA US LLC, Auburn Hills, MI (US)

(72) Inventors: Mostafa Ahmed, Windsor (CA); Andrew White, Holly, MI (US)

(73) Assignee: FCA US LLC, Auburn Hills, MI (US)

( * ) Notice: Subject to any disclaimer, the term of this patent is extended or adjusted under 35 U.S.C. 154(b) by 192 days.

(21) Appl. No.: 18/424,982

(22) Filed: Jan. 29, 2024

(65) Prior Publication Data

US 2025/0242715 A1    Jul. 31, 2025

(51) Int. Cl.
| | |
|---|---|
| *B60L 58/12* | (2019.01) |
| *B60L 3/12* | (2006.01) |
| *G01R 31/367* | (2019.01) |
| *G01R 31/3835* | (2019.01) |

(52) U.S. Cl.
CPC ............ *B60L 58/12* (2019.02); *B60L 3/12* (2013.01); *G01R 31/367* (2019.01); *G01R 31/3835* (2019.01)

(58) Field of Classification Search
None
See application file for complete search history.

(56) References Cited

U.S. PATENT DOCUMENTS

| | | | |
|---|---|---|---|
| 9,718,455 B2 | 8/2017 | Yu et al. | |
| 10,838,010 B2 | 11/2020 | Heiries et al. | |
| 2008/0243405 A1* | 10/2008 | Iwane | G01R 31/3835 |
| | | | 702/63 |
| 2015/0377974 A1* | 12/2015 | Choi | G01R 31/367 |
| | | | 702/63 |
| 2016/0202325 A1* | 7/2016 | Tang | G01R 31/367 |
| | | | 702/63 |

FOREIGN PATENT DOCUMENTS

| | | |
|---|---|---|
| CN | 103941195 B | 2/2017 |
| CN | 109061506 A | 12/2018 |

* cited by examiner

*Primary Examiner* — Peter D Nolan
*Assistant Examiner* — Jacob Kent Besteman-Street
(74) *Attorney, Agent, or Firm* — Jeremy J. Klobucar

(57) ABSTRACT

A state of charge (SOC) estimation system for a battery system of an electrified vehicle is configured to detect a change in a measured open-circuit voltage (OCV) of the battery system, wherein the detected change in the measured OCV of the battery system is indicative of a wake-up of a battery pack control module (BPCM), and in response to the detected change in the measured OCV of the battery system, initialize a Kalman filter of the BPCM, wherein the Kalman filter is configured to estimate an SOC of the battery system, and wherein the initialization of the Kalman filter based on the detected change in the measured OCV of the battery system improves an accuracy of the battery system SOC estimation by avoiding improper Kalman filter initialization.

12 Claims, 2 Drawing Sheets

KALMAN FILTER INITIALIZATION CONTROL STRATEGY

FIELD

The present application generally relates to electrified vehicles and, more particularly, to a Kalman filter initialization control strategy for vehicle battery system state of charge (SOC) estimation.

BACKGROUND

Electrified vehicles have an electrified powertrain that includes at least one electric motor powered by electrical energy provided by a battery system. These electric motor(s) could be used for vehicle propulsion and/or for assisting an internal combustion engine of the electrified powertrain (e.g., stop/start operations). One critical parameter for operation of the electrified powertrain is a state of charge (SOC) of the battery system. The SOC of the battery system represents an amount of charge or energy available in the battery system at a specific point in time (e.g., 90%). The SOC of the battery system is not directly measurable and thus is estimated based on other parameters. One of the most accurate and robust battery system SOC estimation methods is utilizing a Kalman filter. Improper initialization of the Kalman filter, however, could result in inaccurate battery system SOC estimation. Accordingly, while such conventional battery system SOC estimation systems do work well for their intended purpose, there exists an opportunity for improvement in the relevant art.

SUMMARY

According to one example aspect of the invention, a state of charge (SOC) estimation system for a battery system of an electrified vehicle is presented. In one exemplary implementation, the SOC estimation system comprises a set of sensors configured to measure a set of operating parameters of the battery system, wherein the set of operating parameters includes a measured open circuit voltage (OCV) of the battery system and a control system configured to detect a change in the measured OCV of the battery system, wherein the detected change in the measured OCV of the battery system is indicative of a wake-up of a battery pack control module (BPCM), and in response to the detected change in the measured OCV of the battery system, initialize a Kalman filter of the BPCM, wherein the Kalman filter is configured to estimate an SOC of the battery system, wherein the initialization of the Kalman filter based on the detected change in the measured OCV of the battery system improves an accuracy of the battery system SOC estimation by avoiding improper Kalman filter initialization.

In some implementations, the wake-up of the BPCM corresponds to a power-up of an electrical system of the electrified vehicle, and wherein the electrical system includes a high voltage bus connected to the battery system via a contactor. In some implementations, the Kalman filter defines an equivalent circuit based model of the battery system and states including the measured OCV of the battery system and a previously-estimated OCV of the battery system. In some implementations, the BPCM latches or stores the current measured OCV as the current estimated OCV of the battery system and then continues using the current estimated OCV as part of the SOC estimation of the battery system In some implementations, the BPCM does not transition to a sleep state during a short key-cycle of the electrified vehicle, and wherein the measured OCV remains constant and the Kalman filter is not initialized. In some implementations, the control system is configured to not initialize the Kalman filter based only on power signals of the BPCM.

According to another example aspect of the invention, an SOC estimation method for a battery system of an electrified vehicle is presented. In one exemplary implementation, the SOC estimation method comprises providing a set of sensors configured to measure a set of operating parameters of the battery system, wherein the set of operating parameters includes a measured OCV of the battery system, detecting, by a control system and using the set of sensors, a change in the measured OCV of the battery system, wherein the detected change in the measured OCV of the battery system is indicative of a wake-up of a BPCM configured to control the battery system, and in response to the detected change in the measured OCV of the battery system, initializing, by the control system, a Kalman filter of the BPCM, wherein the Kalman filter is configured to estimate the SOC of the battery system, wherein the initialization of the Kalman filter based on the detected change in the measured OCV of the battery system improves an accuracy of the battery system SOC estimation by avoiding improper Kalman filter initialization.

In some implementations, the wake-up of the BPCM corresponds to a power-up of an electrical system of the electrified vehicle, and wherein the electrical system includes a high voltage bus connected to the battery system via a contactor. In some implementations, the Kalman filter defines an equivalent circuit based model of the battery system and states including the measured OCV of the battery system and a previously-estimated OCV of the battery system. In some implementations, the BPCM latches or stores the current measured OCV as the current estimated OCV of the battery system and then continues using the current estimated OCV as part of the SOC estimation of the battery system. In some implementations, the BPCM does not transition to a sleep state during a short key-cycle of the electrified vehicle, and wherein the measured OCV remains constant and the Kalman filter is not initialized. In some implementations, the method further comprises not initializing, by the control system, the Kalman filter based only on power signals of the BPCM.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, one of the most accurate and robust battery system state of charge (SOC) estimation methods is utilizing a Kalman filter. This involves modeling the battery system (i.e., an equivalent circuit battery model) and recursively estimating the battery system states (including SOC) based on previously-estimated states and other measured parameters. One of these parameters is an open circuit voltage (OCV) of the battery system. In operation, the Kalman filter is initialized upon wakeup of the battery pack control module (BPCM) from a sleep state. In conventional applications, this initialization is triggered or generated based on BPCM power signals. However, there are cases when the vehicle ignition is turned off and then quickly turned back on such that the BPCM does not actually go to sleep. When this occurs, new measured OCV and stored estimated OCV values are not taken and the SOC is improperly initialized to old values. This results in an inaccurate SOC estimation, which could potentially result in the driver and the vehicle being stranded due to improper planning based on the estimated SOC (e.g., "X miles of charge remaining").

Accordingly, improved battery system SOC estimation systems and methods for electrified vehicles are presented herein. These techniques control initialization of a Kalman filter of the BPCM based on observed changes in the measured OCV and not based on the BPCM power signals. It will be appreciated that the Kalman filter technique of the present application could be any suitable Kalman filter technique (extended Kalman filtering, unscented Kalman filtering, etc.). The OCV can only be measured before the high voltage bus contactors have closed during BPCM wake-up and thus a new measurement will be taken and latched (stored) during each BPCM wake-up. If the BPCM does not go to sleep during a short key cycle as described above, the measured OCV will remain constant and the Kalman filter initialization will not be triggered. The primary benefit of this improved technique is a more accurate battery system SOC estimation.

Figure 1:
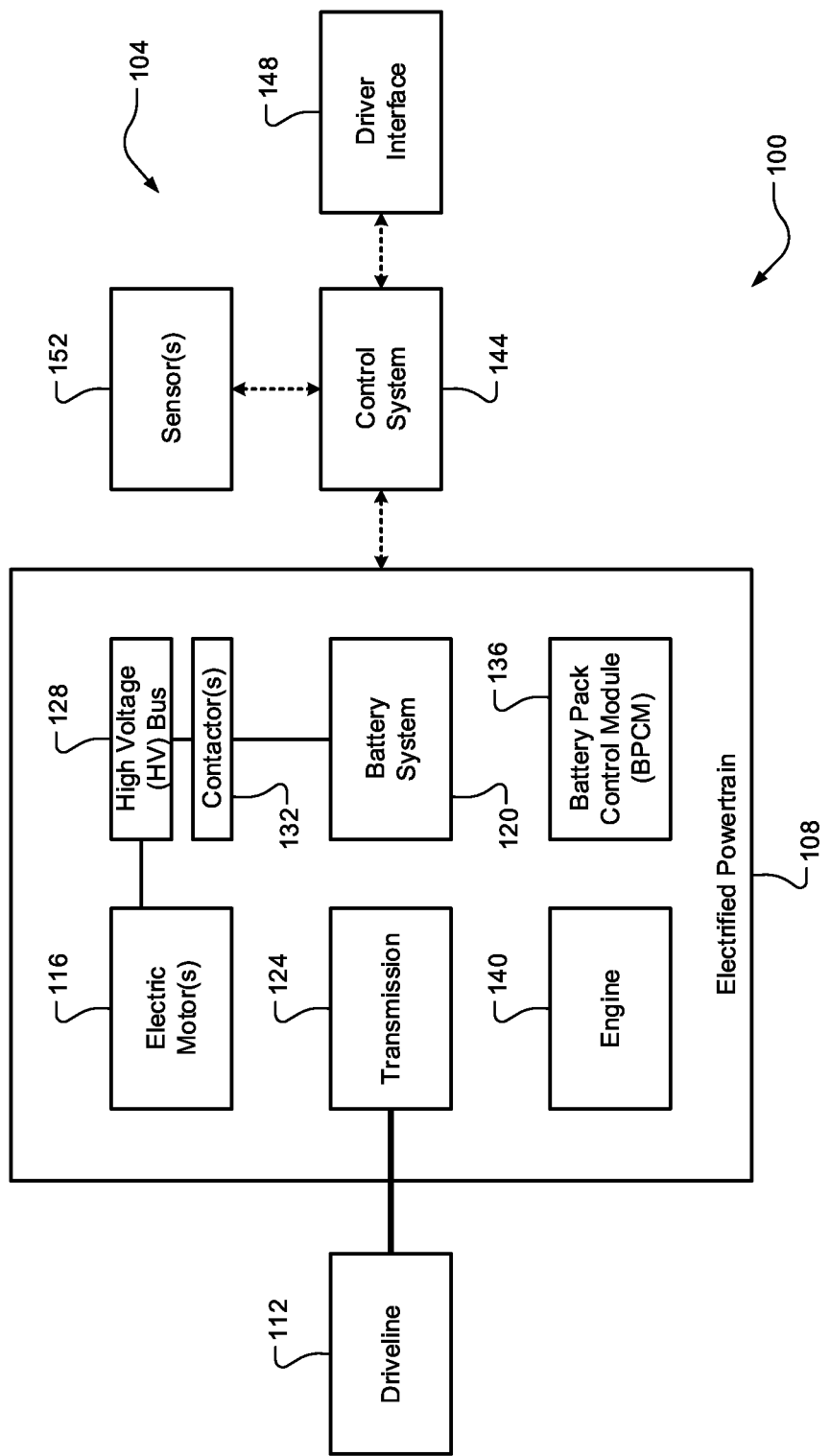
FIG. 1 is a functional block diagram of a vehicle having an example battery system state of charge (SOC) estimation system according to the principles of the present application.

Referring now to FIG. 1, a functional block diagram of an electrified vehicle 100 having an example battery system SOC estimation system 104 according to the principles of the present application is illustrated. The electrified vehicle 100 primarily comprises an electrified powertrain 108 that is configured to generate and transfer torque to a driveline 112 for vehicle propulsion. The electrified powertrain 108 generally comprises one or more electric motors 116 powered by a battery system 120 (e.g., a high voltage (HV) battery pack). The electric motor(s) 116 are configured to generate torque that is transferred to the driveline via a transmission 124, such as a multi-speed automatic transmission.

An electrical system of the electrified vehicle 100 includes an HV bus 128 that connects the electric motor(s) 116 to the battery system 120 with one or more contactor(s) 132 (e.g., switches) therebetween for electrical isolation. The contactor(s) 132 could be, for example, traditional single-pole, single-throw contactors or double-pole, single-throw breaktors. A BPCM 136 controls operation of the battery system 120. In some implementations, the electrified powertrain 108 could also include an internal combustion engine 140 configured either for propulsion or for electrical energy generation and recharging of the battery system 120.

A controller or control system 144 comprising one or more controllers or electronic control units (ECUs) is configured to control operation of the electrified vehicle 100. This primarily includes controlling the electrified powertrain 108 to generate an amount of drive torque to satisfy a torque request received from a driver via a driver interface 148 (e.g., an accelerator pedal). The electrified vehicle 100 also includes a set of one or more sensors 152 configured to measure various operating parameters of the electrified vehicle 100, such as one or more operating parameters of the battery system 120 (current, voltage, etc.). One key parameter that is monitored by the sensor(s) 152 is the OCV of the battery system 120. The OCV represents a measurement of the voltage or potential difference across two terminals (e.g., positive and negative battery terminals) of the battery system 120 when the battery system 120 is well-rested (i.e., after a certain period of time). The control system 144 (e.g., including the BPCM 136) is also configured to perform at least a portion of the SOC estimation techniques of the present application, which will now be discussed in greater detail.

Figure 2:
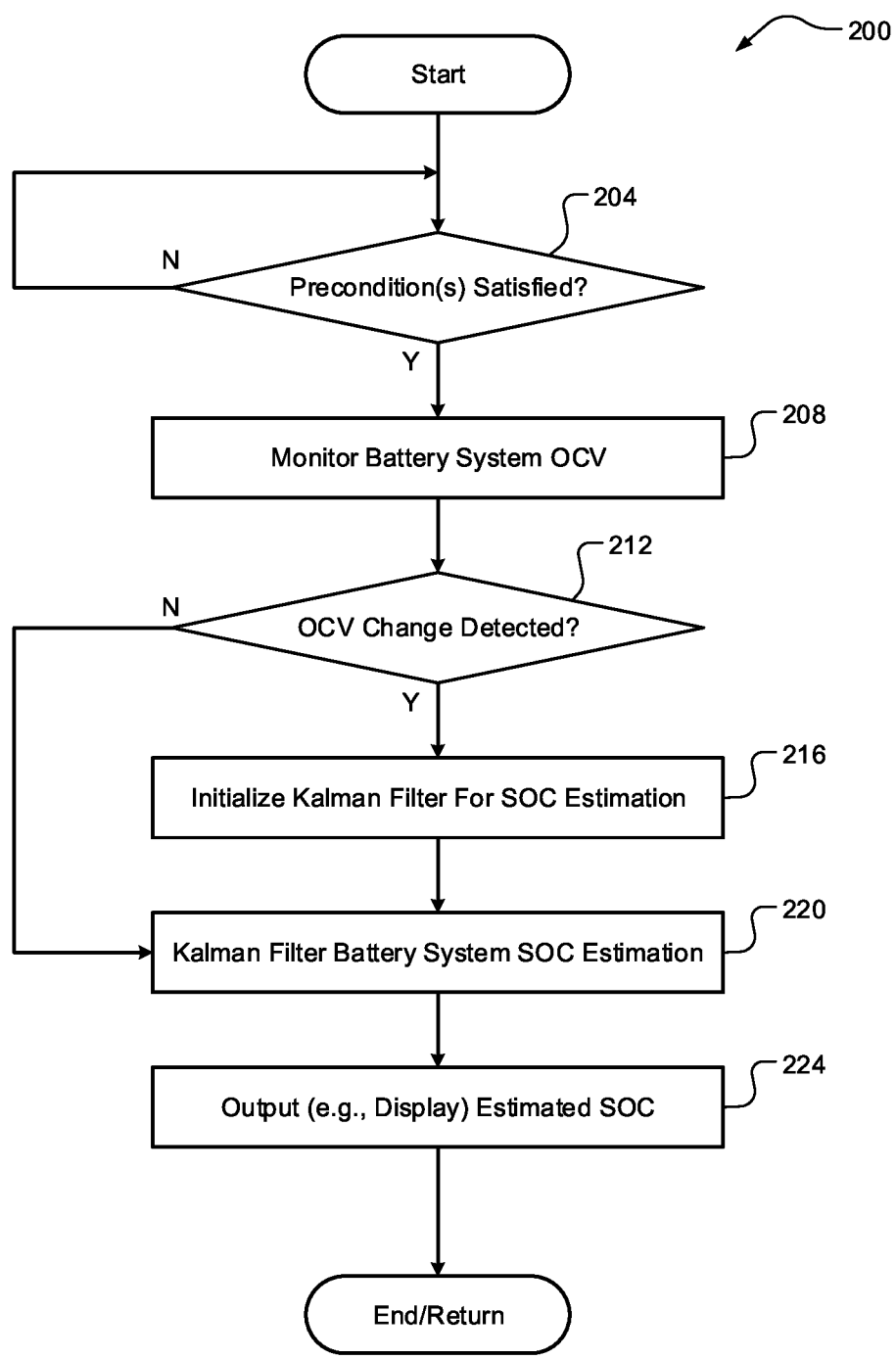
FIG. 2 is a flow diagram of an example Kalman filter initialization method vehicle battery system SOC estimation according to the principles of the present application.

Referring now to FIG. 2, a flow diagram of an example SOC estimation method 200 for a battery system of an electrified vehicle according to the principles of the present application is illustrated. At 204, the control system 144 determines whether a set of one or more optional preconditions have been satisfied. These precondition(s) could include, for example only, there being no faults or malfunctions present that would negatively impact or otherwise inhibit the operation of the techniques of the present application. For example, this could include the electrical system of the electrified vehicle 100 having no faults or malfunctions associated therewith (e.g., stuck/welded contactor(s) 132 or the like). When false, the method 200 ends or returns to 204. When true, the method 200 proceeds to 208. At 208, the control system 144 monitors the measured OCV of the battery system 120. Specifically, the control system 144 is monitoring for a change in the measured OCV. This change in the measured OCV corresponds to a wake-up of the BPCM 136, such as during a key-on power-up of the electrified vehicle 100.

At 212, the control system 144 determines whether the change in the measured OCV of the battery system 120 is observed. The change in OCV happens because the OCV signal starts with a value of zero when BPCM 136 starts then changes once OCV is measured and latched so the signal does not change during runtime. Thus, when the wake-up of the BPCM 136 is not occurring, there should be no change in the measured OCV of the battery system 120. When false, the method 200 proceeds to 220. When true, the method 200 proceeds to 216.

At 216, the control system 144 initializes the Kalman filter in the BPCM 136. This initialization includes, for example, setting the current OCV estimation to the current OCV measurement and then continually using the current estimated OCV as part of the SOC estimation of the battery system 120 at 220. At 224, after estimating the SOC of the battery system 120, the control system 144 outputs the estimated SOC, such as to a display for a driver of the electrified vehicle 100. For example, the display could be an infotainment unit display or an in-dash display or gauge of the electrified vehicle (e.g., "X miles of charge remaining"). The method 200 then ends or returns to 204 for one or more additional cycles.

For general reference, a simple equivalent circuit model for a battery model for the battery system 120 and a Kalman filter SOC estimation technique or process will be described in greater detail. The equivalent circuit model generally includes a voltage source V0 (e.g., a battery cell) and two resistors R0 (terminal resistance) and R1 in series, with a capacitance C1 in parallel with resistor R1 (where R1 and C1 collectively represent the charge dynamics). There is also a single time constant τ. States of the Kalman filter include cell voltage (V1) and the SOC, which is an immeasurable internal state. Measured cell voltage (battery system voltage) can be compared to the predicted cell voltage (predicted battery system voltage) by the battery model and the estimated accuracies of the measurement and the model predictions are evaluated and thereafter corrected. This results in a recursively estimated SOC for the battery system 120. Because this recursive estimation takes into account past states, improper initialization of the Kalman filter could result in inaccurate SOC estimation.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A state of charge (SOC) estimation system for a battery system of an electrified vehicle, the SOC estimation system comprising:
   a set of sensors configured to measure a set of operating parameters of the battery system, wherein the set of operating parameters includes a measured open circuit voltage (OCV) of the battery system; and
   a control system configured to:
      detect a change in the measured OCV of the battery system, wherein the detected change in the measured OCV of the battery system is indicative of a wake-up of a battery pack control module (BPCM); and
      in response to the detected change in the measured OCV of the battery system, initialize a Kalman filter of the BPCM, wherein the Kalman filter is configured to estimate an SOC of the battery system,
      wherein the initialization of the Kalman filter based on the detected change in the measured OCV of the battery system improves an accuracy of the battery system SOC estimation by avoiding improper Kalman filter initialization.

2. The SOC estimation system of claim 1, wherein the wake-up of the BPCM corresponds to a power-up of an electrical system of the electrified vehicle, and wherein the electrical system includes a high voltage bus connected to the battery system via a contactor.

3. The SOC estimation system of claim 2, wherein the Kalman filter defines an equivalent circuit based model of the battery system and states including the measured OCV of the battery system and a previously-estimated OCV of the battery system.

4. The SOC estimation system of claim 3, wherein the BPCM latches or stores the current measured OCV as the current estimated OCV of the battery system and then continues using the current estimated OCV as part of the SOC estimation of the battery system.

5. The SOC estimation system of claim 4, wherein the BPCM does not transition to a sleep state during a short key-cycle of the electrified vehicle, and wherein the measured OCV remains constant and the Kalman filter is not initialized.

6. The SOC estimation system of claim 1, wherein the control system is configured to not initialize the Kalman filter based only on power signals of the BPCM.

7. A state of charge (SOC) estimation method for a battery system of an electrified vehicle, the SOC estimation method comprising:
   providing a set of sensors configured to measure a set of operating parameters of the battery system, wherein the set of operating parameters includes a measured open circuit voltage (OCV) of the battery system;
   detecting, by a control system and using the set of sensors, a change in the measured OCV of the battery system, wherein the detected change in the measured OCV of the battery system is indicative of a wake-up of a battery pack control module (BPCM) configured to control the battery system; and
   in response to the detected change in the measured OCV of the battery system, initializing, by the control system, a Kalman filter of the BPCM, wherein the Kalman filter is configured to estimate an SOC of the battery system,
   wherein the initialization of the Kalman filter based on the detected change in the measured OCV of the battery system improves an accuracy of the battery system SOC estimation by avoiding improper Kalman filter initialization.

8. The SOC estimation method of claim 7, wherein the wake-up of the BPCM corresponds to a power-up of an electrical system of the electrified vehicle, and wherein the electrical system includes a high voltage bus connected to the battery system via a contactor.

9. The SOC estimation method of claim 8, wherein the Kalman filter defines an equivalent circuit based model of the battery system and states including the measured OCV of the battery system and a previously-estimated OCV of the battery system.

10. The SOC estimation method of claim 9, wherein the BPCM latches or stores the current measured OCV as the current estimated OCV of the battery system and then continues using the current estimated OCV as part of the SOC estimation of the battery system.

11. The SOC estimation method of claim 10, wherein the BPCM does not transition to a sleep state during a short key-cycle of the electrified vehicle, and wherein the measured OCV remains constant and the Kalman filter is not initialized.

12. The SOC estimation method of claim 7, further comprising not initializing, by the control system, the Kalman filter based only on power signals of the BPCM.

* * * * *